Figure 1:
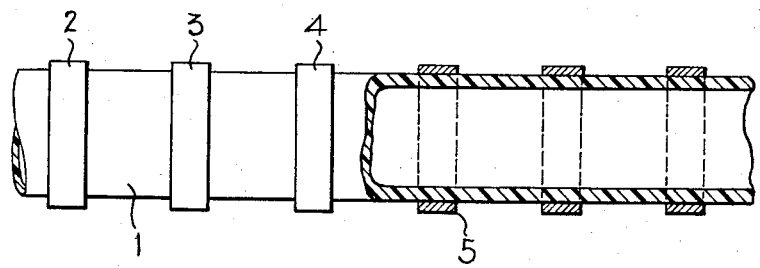

March 9, 1965  J. TUDGE  3,172,428
FLEXIBLE HOSE
Filed June 25, 1962

INVENTOR
JOSEPH TUDGE 3,172,428
FLEXIBLE HOSE
Joseph Tudge, Walkden, Manchester, England, assignor to Associated Electrical Industries Limited, London, England, a company of Great Britain
Filed June 25, 1962, Ser. No. 205,017
Claims priority, application Great Britain, July 6, 1961, 24,504/61
2 Claims. (Cl. 138—172)

The present invention relates to hose constituted of an electrically insulating material and is concerned in particular with hose capable of withstanding distortion due to external pressure applied thereto.

A hose constituted of electrically insulating material and capable of resisting distortion due to external pressure applied thereto, according to the present invention is provided with a plurality of spaced rings extending along the hose, each ring surrounding the hose and being contiguous with the outer surface thereof.

The rings may be of metal, preferably of an annealed low carbon steel which is capable of being deformed into contact with the hose by applied pressure to be secured therearound. Conveniently the rings may be secured around the hose by crimping or swaging.

Although the hose may be constituted of tubing having an oval or other cross section, the rings secured therearound, according to the present invention, are most effective when used in conjunction with a tube of circular cross section.

The rings reinforce the hose against distortion due to applied external pressure by maintaining the peripheral profile thereof at those surface areas contiguous with the rings, and at regions immediately adjacent thereto.

External pressure tending to cause collapse of the hose at one region will tend to produce an outward extension thereof at other regions on the periphery, which extension is resisted by the rigid ring thus producing a reinforcing effect. The reinforcing effect occurs beneath the ring and at regions immediately adjacent thereto, the spacing of the rings being selected such that the required reinforcing effect against a given applied external pressure is obtained.

The use of rings to reinforce hose of electrically insulating material according to the present invention, does not, furthermore, introduce an electrically conducting path therealong, such as is produced by known reinforcing means, for example by a reinforcing wire embedded in the hose and spirally wound therealong.

Reinforcement of the hose, if constituted of polytetrafluoroethylene in accordance with the present invention increases the collapse pressure thereof by over ten-fold at a temperature of 140° C. A hose is thus produced which has a greater flexibility than those reinforced hoses hitherto used, since the need for any continuous form of reinforcement, as hereinbefore set forth whereby additional stiffness is imparted, is eliminated.

The metal rings may be conveniently crimped on to the tubing by inserting the ring within, say, an eight jaw chuck, each jaw simultaneously moving in radially to crush the ring to a smaller diameter, such that its inner surface becomes contiguous with the outer surface of the hose. The radius of the electrically insulating hose is preferably reduced in the region of each metal ring, by continuing the crimping thereof to the hose after initial contact therebetween has been provided. This ensures that the peripheral wall of the hose is placed under compressive stress at regions immediately beneath each ring, and adjacent thereto. The wall of the hose is thus provided with a convex surface both along and perpendicular to the axis thereof, which further enables it to resist distortion due to externally applied pressure.

Figure 2:
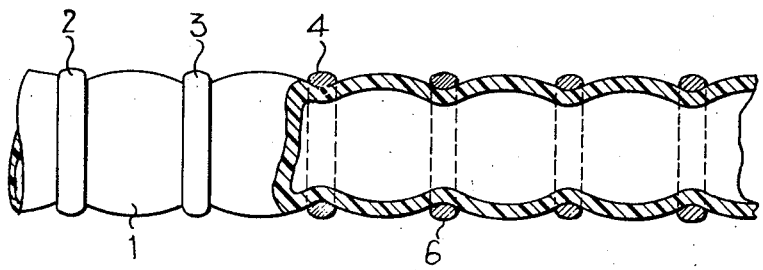

An example of a hose provided with the reinforcing rings therearound as disclosed by the present invention illustrated in part section in FIGS. 1 and 2 of the accompanying drawing.

In FIGS. 1 and 2 a hose constituted of a tube of flexible electrically insulating material 1, for example polytetrafluoroethylene is shown as being of circular cross section and is provided with the reinforcing rings 2, 3 and surrounding the hose 1 and contiguous with the outer surface thereof. The rings may be of square or rectangular wall section, 5, as shown in FIG. 1, or may alternatively be of oval, 6, or other convenient wall section as shown in FIG. 2.

As also shown in FIG. 2 the rings may be deformed into contact with the hose such that inward deformation of the hose at the contacting regions is produced thereby.

The periphery of the hose is, in this embodiment placed under compressive stress at regions immediately surrounding each ring and is provided therefore with a concave surface in the regions between the rings, both along the axis of the hose, and at right angles thereto.

Such an arrangement further increases the resistance of the hose to distortion by external pressure.

Although the spacing of the rings along the tube shown as being regular, the spacing may be varied such that it is smaller where the external pressure applied greatest and vice versa without materially affecting the flexibility of the hose or the electrical insulation thereof The invention is particularly intended for application in connection with large turbo-generators provided with combined gas and water-cooling means, wherein the flexible hose is used in conveying water from the water manifold to cooling passages around the stator windings to effect cooling thereof. The use of an external reinforced hose in accordance with the present invention enables the pressure of the cooling gas (preferably hydrogen) within the turbo-generator casing to be increased without collapse of water-cooling hoses. A higher cooling gas pressure enables in turn more efficient cooling of the gas-cooled parts (such as the core and rotor) to take place with a consequent increase in the rating of the turbo-generator. As a precaution against leaks, it desirable to arrange that the water pressure is less than the gas pressure.

In an application of this invention to a large turbo generator, the polytetrafluoroethylene tubing may typically have a ½" bore and an outside diameter of $^{11}\!/_{16}$". The metal rings, for example of low carbon steel, would therefore have a bore of just greater than $^{11}\!/_{16}$" in order that they may be threaded on to the tubing: the wall thickness of the rings may conveniently be $^{1}\!/_{32}$" and their axial length $^{3}\!/_{16}$", the rings being spaced at ½" intervals along the outside of the tubing. After the rings are crimped or swaged on to the tubing, they are permanently deformed, their diameter being reduced by about $^{1}\!/_{16}$".

Although the present invention has been described with particular reference to its applications in connection with turbo-generators, it is intended that it should not necessarily be so limited, and it can be used in other applications where a hose having a strong reinforcement against external pressure is required.

What I claim is:
1. An electrically non-conductive hose of improved resistance to collapse against external fluid pressure consisting of a non-corrugated tube having a predetermined flexibility, said tube being constituted of a flexible electrically insulating material and having a thickness so related to the diameter thereof and to said material inward distortion of any circumferential region of tube is normally accompanied by an outward distortion at an adjacent circumferential region, and a plurality of individual circumferential continuous relatively rigid rings surrounding said tube in longitudinally spaced apart relation, said spacing of said rigid rings being sufficient to substantially preserve said flexibility, each of said rings having its inner surface contiguous with a circumferential region of the outer surface of said tube and effective to prevent outward distortion along said contiguous portions of said outer surface.

2. A hose as claimed in claim 1, in which said rings are constituted of a metal capable of being plastically deformed into contact with said tube.

References Cited in the file of this patent

UNITED STATES PATENTS

| | | |
|---|---|---|
| 267,473 | Westinghouse | Nov. 14, 1882 |
| 1,925,231 | Bundy | Sept. 5, 1933 |
| 2,392,992 | Martin | Jan. 15, 1946 |
| 2,490,513 | Dreyer | Dec. 6, 1949 |
| 2,686,738 | Teeters | Aug. 17, 1954 |
| 2,728,356 | Brinsmade et al. | Dec. 27, 1955 |

FOREIGN PATENTS

| | | |
|---|---|---|
| 747,269 | France | Mar. 28, 1933 |
| 11,895 | Great Britain | May 24, 1902 |
| 507,075 | Great Britain | June 8, 1939 |